United States Patent
Mekid

(10) Patent No.: US 10,161,767 B2
(45) Date of Patent: *Dec. 25, 2018

(54) DIAGNOSTIC AND MEASUREMENT SYSTEM COMPRISING A BRANCHED OPTICAL FIBER EMBEDDED IN A STRUCTURAL ELEMENT

(71) Applicant: KING FAHD UNIVERSITY OF PETROLEUM AND MINERALS, Dhahran (SA)

(72) Inventor: Samir Mekid, Manchester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,088

(22) Filed: Aug. 2, 2018

(65) Prior Publication Data

US 2018/0340797 A1    Nov. 29, 2018

Related U.S. Application Data

(63) Continuation of application No. 15/170,885, filed on Jun. 1, 2016, now Pat. No. 10,066,968.

(51) Int. Cl.
| | |
|---|---|
| *G01D 5/26* | (2006.01) |
| *G01D 5/353* | (2006.01) |
| *G01J 3/02* | (2006.01) |

(52) U.S. Cl.
CPC ......... *G01D 5/268* (2013.01); *G01D 5/35316* (2013.01); *G01J 3/0218* (2013.01)

(58) Field of Classification Search
CPC .... G01D 5/268; G01D 5/35316; G01J 3/0218
(Continued)

(56) References Cited

U.S. PATENT DOCUMENTS

| | | | |
|---|---|---|---|
| 5,118,931 A | 6/1992 | Udd et al. | |
| 5,942,750 A * | 8/1999 | Sannerhaugen | G01B 11/18 250/227.14 |

(Continued)

FOREIGN PATENT DOCUMENTS

CN        203929033        11/2014

OTHER PUBLICATIONS

Hotate et al., "Fiber Optic Nerve Systems for Structures and Materials That Can Feel Pain," IEEE LEOS Newsletter, Feb. 2006, pp. 5-10.

(Continued)

*Primary Examiner* — Que Tan Le
(74) *Attorney, Agent, or Firm* — Oblon, McClelland, Maier & Neustadt, L.L.P.

(57) ABSTRACT

The system with branched optical fibers provides diagnostics and measurement of static and/or dynamic parameters in structures and structural elements. The system includes a structural material or element having a branched optical fiber embedded therein. The branched optical fiber includes a primary optical fiber segment and at least one secondary optical fiber segment branching therefrom. One or more fiber Bragg grating sensors are arranged on, and are in optical communication with, the primary optical fiber segment and the at least one secondary optical fiber segment. A signal analyzer receives signals generated by the fiber Bragg grating sensors representative of a magnitude of the physical parameter of the structural element.

6 Claims, 3 Drawing Sheets

(58) Field of Classification Search
USPC .................................................. 250/227.14
See application file for complete search history.

(56) References Cited

U.S. PATENT DOCUMENTS

| | | |
|---|---|---|
| 6,486,465 B1 | 11/2002 | Hein |
| 7,154,081 B1 | 12/2006 | Friedersdorf et al. |
| 7,176,448 B2 | 2/2007 | Ogisu |
| 7,702,190 B2 | 4/2010 | Hao et al. |
| 7,714,271 B1 | 5/2010 | Levine |
| 7,973,914 B2 | 7/2011 | Omichi et al. |
| 8,705,019 B2 | 4/2014 | Mekid |
| 8,909,040 B1 | 12/2014 | Parker, Jr. et al. |
| 2012/0201656 A1 | 8/2012 | Johnston |

OTHER PUBLICATIONS

Havermann et al., "Temperature and strain measurements with fibre Bragg gratings embedded in stainless steel 316," J. Lightwave Technol., 2015, 33, 2474-2479.

\* cited by examiner

DIAGNOSTIC AND MEASUREMENT SYSTEM COMPRISING A BRANCHED OPTICAL FIBER EMBEDDED IN A STRUCTURAL ELEMENT

CROSS-REFERENCE TO RELATED APPLICATIONS

The present application is a Continuation of Ser. No. 15/170,885, now allowed, having a filing date of Jun. 1, 2016.

BACKGROUND OF THE INVENTION

1. Field of the Invention

The present invention relates to diagnostics and measurement of static and/or dynamic strains in structures, structural elements and structural materials, and particularly to a structural material with branched optical fibers embedded in the structural material for measurement of physical parameters.

2. Description of the Related Art

The science of determining changes to the material and/or geometric properties of a structure is referred to as Structural Health Monitoring (SHM). Generally, SHM involves the observation of a structure over time using periodically sampled measurements from an array of sensors, and the analysis of these measurements to determine the current state of structural health. There are many different sensors and sensing networks for accomplishing this, but many have inherent limitations that render them unsuitable for certain applications.

One technique that is rapidly gaining in popularity involves fiber optic sensing networks. Optical fiber sensors typically involve a light propagating beam which travels along an optical fiber network. Within each fiber the light is modulated as a function of strain, temperature, bending or other physical or chemical stimuli. The modulation can be analyzed in either reflection or transmission to determine the characteristic of interest. Optical fiber sensors (OFS) have many distinct advantages including immunity to electromagnetic interference, long lifetime, lightweight, small size, low cost, high sensitivity, etc. Optical fiber sensors (OFS) are typically composed of numerous optical fibers and numerous Fiber Bragg gratings (FBGs) periodically-spaced along the length of each fiber. Each FBG creates a periodic variation of the optical refractive index in the core of its associated optical fiber, and when coupled to an interferometer it becomes possible to detect strain individually through change in its resonant wavelength (i.e., the wavelength at which each grating has its maximum reflectance).

"Smart" or "nervous" materials with embedded optical fibers are in a relatively early stage, having the embedded fiber Bragg grating (FBG) array sensors, piezo wires or the like arranged in a relatively rudimentary and conventional manner. For example, materials with FBG array sensors arranged in linear stripes and as a regular, rectangular grid pattern are known. Such arrangements provide models for "proof of concept" purposes, but are not well suited to "real world" implementations, where measurements are typically not taken linearly and/or in regular patterns.

Thus, a system with branched optical fibers addressing the aforementioned problems is desired.

SUMMARY OF THE INVENTION

The system with branched optical fibers provides diagnostics and measurement of static and/or dynamic parameters in structures and structural elements. The parameters are physical parameters, such as stress, strain, deformation, temperature or the like. The system includes a structural material having a branched optical fiber embedded therein. The branched optical fiber includes a primary optical fiber segment and at least one secondary optical fiber segment branching therefrom. A light source, such as a laser, is optically coupled with the primary optical fiber segment, as is a signal or spectral analyzer.

A plurality of fiber Bragg grating sensors are provided, such that a first set of the plurality of fiber Bragg grating sensors are arranged on, and are in optical communication with, the primary optical fiber segment, and a second set of the plurality of fiber Bragg grating sensors are arranged on, and are in optical communication with, the at least one secondary optical fiber segment. The signal analyzer is in communication with the plurality of fiber Bragg grating sensors to receive signals generated by the fiber Bragg grating sensors representative of a magnitude of the physical parameter of the structural element.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
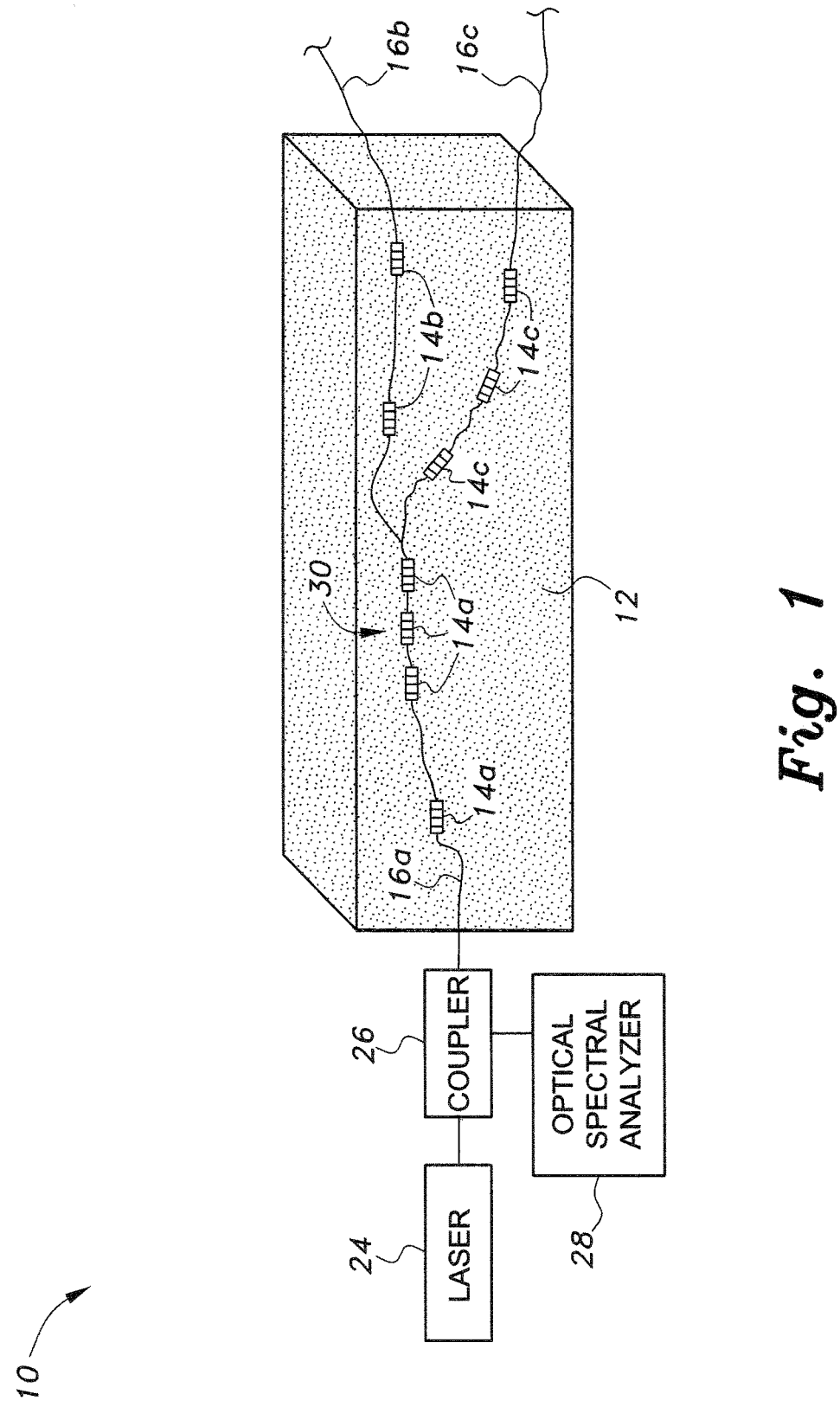
FIG. 1 diagrammatically illustrates a system with branched optical fibers according to the present invention.

The system with branched optical fibers 10 provides diagnostics and measurement of static and/or dynamic parameters in structures and structural elements. The parameters are physical parameters, such as stress, strain, deformation, temperature or the like. As best shown in FIG. 1, the system with branched optical fibers 10 can include a structural element 12. It should be understood that the shape and relative dimensions of the structural element shown in FIG. 1 are shown for exemplary purposes only. The structural element 12 may be aluminum, steel, plastic, polyvinyl chloride (PVC) or any other structural material.

As best seen in FIG. 1, the structural element 12 has a branched optical fiber 30 embedded therein. In the example of FIG. 1, the branched optical fiber 30 includes a primary optical fiber segment 16a with two secondary optical fiber segments 16b, 16c branching therefrom within the bulk of structural element 12. A light source, such as laser 24, is optically coupled with the primary optical fiber segment 16a, as is a signal analyzer, which may be a conventional optical spectral analyzer 28 or the like. It should be understood that any suitable type of conventional optical coupler 26 may be used to couple laser 24 and optical spectral analyzer 28 with the primary optical fiber segment 16a.

The structural element 12 can be any material suitable for forming a structural element. For example, the structural element 12 can be formed from thermoplastic or sintered metal materials. The branched optical fiber 30 may be embedded within structural element 12 by any suitable method of fabrication. For example, in the case of plastics, PVC and other thermoplastic or thermomoldable materials, the thermomoldable material may be melted, poured into a mold to form the structural element and have the branched optical fiber 30 embedded therein within the mold. Alternatively, a rapid prototyping machine or the like could manufacture structural element 12 with the branched optical fiber 30 embedded therein in sequential steps. As another example, for steel, aluminum and the like, the system with branched optical fibers 10 could be formed through powder sintering, as described in detail below.

In an embodiment, aluminum powder, for example, can be placed in a die and the branched optical fiber 30 can be embedded within the powder in the die. A press can then be used to compress the powder with the branched optical fiber 30 embedded therein. The compressed structure can then be sintered in a conventional oven, a microwave oven or the like. Desired positioning of the optical fiber within the material can be accomplished during the manufacturing process by transmission of light therethrough to be received by a receiver for measuring transmitted optical power.

The optical fiber branch can be formed from a suitable fiber optic material, e.g., silica. The optical fiber branch can be cut to a desired size and connected to a main fiber branch or ramification using welding techniques, e.g., $CO_2$ laser. The fiber optic cable can be assembled into a module by initially placing one end of the cable within the package adjacent to a laser diode. The laser diode can then be excited to direct a light beam through the fiber optic cable. The other end of the optic cable can be coupled to a receiver unit which can determine the amount of optical power transmitted through the fiber. The position of the fiber can be varied until a predetermined optical power is detected by the receiver unit which corresponds to an optimal alignment position of the cable. The fiber can then be removed from the package and the clip placed on a package substrate. The fiber cable can be re-inserted into the module and onto the clip at the optimal position. For example, the cable can be adjusted until a maximum optical power is detected to indicate alignment between the cable and the laser diode. The clip can then be laser welded to the substrate. The fiber optic cable can once again be adjusted until the cable is aligned with the diode. The ferrule of the cable can then be laser welded to corners of the clip.

Figure 2A:
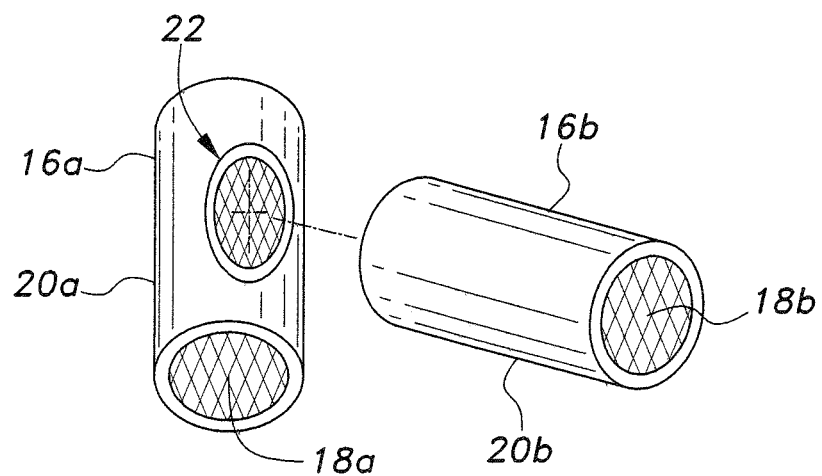
FIG. 2A is an exploded view of an exemplary branched optical fiber, illustrating manufacture of a branched optical fiber segment according to the present invention.
Figure 2B:
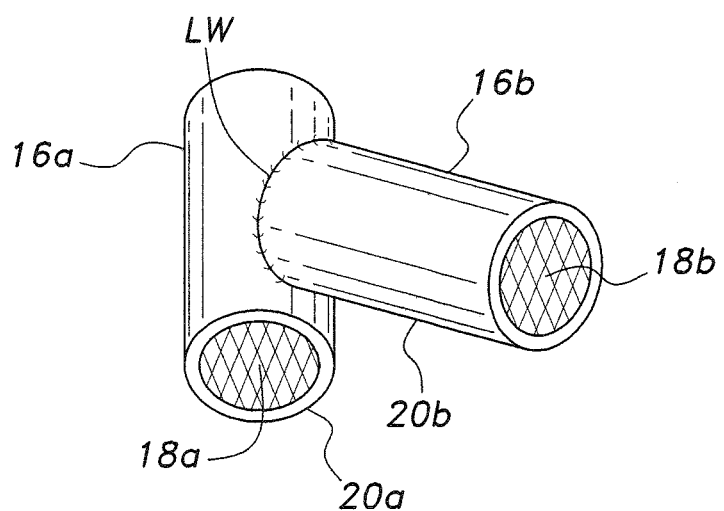
FIG. 2B is a perspective view of the manufactured branched optical fiber segment of FIG. 2A.

As shown in FIGS. 2A and 2B, the branching of the branched optical fiber 30 may be formed via splicing of optical fiber segments. As shown in FIG. 2A, an opening 22 is made through the cladding 20a of primary optical fiber segment 16a. The size and shape of opening 22 is made to match the outer diameter 20b of secondary optical fiber segment 16b when secondary optical fiber segment 16b is positioned at the desired branching angle with respect to primary optical fiber segment 16a. As shown, the cores 18a, 18b are in optical communication at the point of branching. The two optical fiber segments may then be joined together with a laser weld LW, as shown in FIG. 2B, or the like.

One or more fiber Bragg grating sensors are arranged on, and are in optical communication with, the primary optical fiber segment and the at least one secondary optical fiber segment. In the example of FIG. 1, the one or more fiber Bragg grating sensors include first, second and third fiber Bragg grating sensor sets 14a, 14b and 14c, such that the fiber Bragg grating sensors of the first set 14a are arranged on, and are in optical communication with, the primary optical fiber segment 16a, the fiber Bragg grating sensors of the second set 14b are arranged on, and are in optical communication with, the second, branched optical fiber segment 16b, and the fiber Bragg grating sensors of the third set 14c are arranged on, and are in optical communication with, the third, branched optical fiber segment 16c.

As is well known in the art, a fiber Bragg grating (FBG) is a type of distributed Bragg reflector constructed in a short segment of optical fiber that reflects particular wavelengths of light and transmits all others. This is achieved by creating a periodic variation in the refractive index of the fiber core, which generates a wavelength specific dielectric mirror. A fiber Bragg grating can therefore be used as an inline optical filter to block certain wavelengths, or as a wavelength-specific reflector.

As well as being sensitive to strain, the Bragg wavelength is also sensitive to temperature. This means that fiber Bragg gratings can be used as sensing elements in optical fiber sensors. In an FBG sensor, the measurand causes a shift in the Bragg wavelength, $\Delta\lambda_B$ The relative shift in the Bragg wavelength, $\Delta\lambda_B/\lambda_B$, due to an applied strain s and a change in temperature $\Delta T$ is approximately given by $\Delta\lambda_B/\lambda_B = C_S \varepsilon C_T \Delta T$, or $\Delta\lambda_B/\lambda_B = (1-p_e)\varepsilon + (\alpha_A + \alpha_n)\Delta T$, where $C_S$ is the coefficient of strain, which is related to the strain optic coefficient $p_e$, $C_T$ is the coefficient of temperature, which is made up of the thermal expansion coefficient of the optical fiber, $\alpha_A$, and the thermo-optic coefficient, $\alpha_n$. Thus, fiber Bragg gratings can then be used as direct sensing elements for strain and temperature. Fiber Bragg grating sensors for measuring physical parameters are well known in the art. Examples of such are shown in U.S. Pat. No. 7,702,190 B2; U.S. Pat. No. 7,714,271 B1; U.S. Pat. No. 7,973,914 B2; and U.S. Pat. No. 8,705,019 B2, each of which is hereby incorporated by reference in its entirety.

The optical spectral analyzer 28 is in communication with the sets 14a, 14b, 14c of fiber Bragg grating sensors to receive signals generated thereby, which is representative of a magnitude of the physical parameter of the structural element. As an example, if a stress or strain is applied to the material 10, a measurement of the magnitude of the stress or strain is measured by the plurality of fiber Bragg grating sensors, and may also be located by comparison of strain magnitudes measured by each of the individual sensors.

Figure 3:
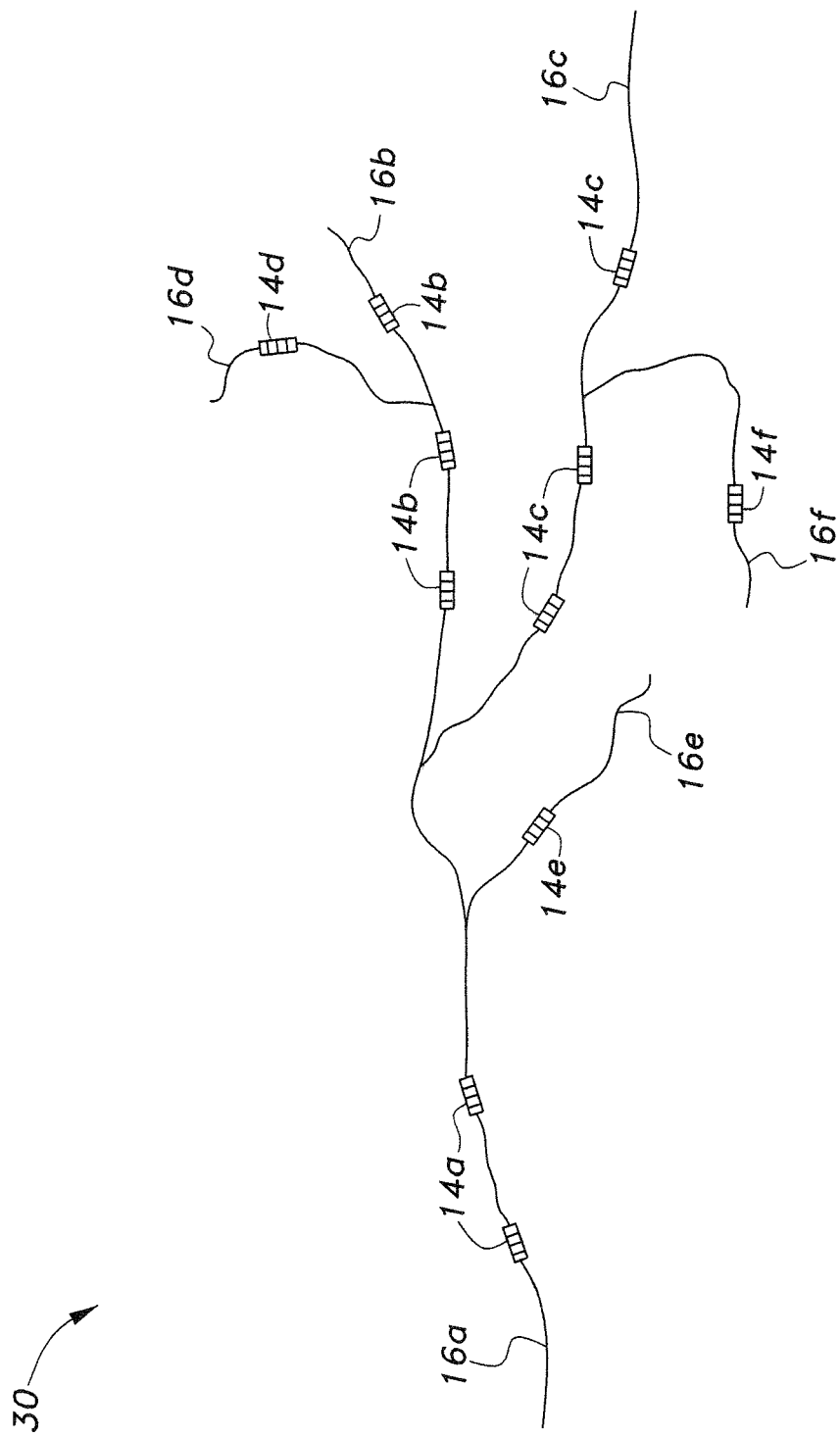
FIG. 3 diagrammatically illustrates an alternative optical fiber branching arrangement for use with the system with branched optical fibers.

The extent of branching of the optical fiber 30 is related to the accuracy and coverage of the sensors embedded within structural element 12. It should be understood that the simple forked structure shown in FIG. 1 is shown for exemplary purposes only. Preferably, multiple levels, or layers, of branching are provided, allowing for greater accuracy and coverage of sensing within the material. As an example, the optical fiber 30 of FIG. 1 is expanded upon the exemplary configuration of FIG. 3. In FIG. 3, optical fiber 30 includes a primary optical fiber segment 16a which branches into optical fiber segments 16b and 16c, as in FIG. 1. However, a further optical fiber segment 16d branches off of optical fiber segment 16b. Similarly, a further optical fiber segment 16f branches from optical fiber segment 16c, and optical fiber segment 16e additionally branches from primary optical fiber segment 16a. Each new segment includes its own corresponding fiber Bragg grating sensors 14d, 14f, 14e, respectively. It should be understood that the configuration shown in FIG. 3 is shown for exemplary purposes only. Further, it should be understood that each of the new branches of FIG. 3 could, in turn, be further branched. It should be further understood that the branching is preferably three-dimensional, allowing sensor measurements to be made throughout the entire volume of the material.

It is to be understood that the present invention is not limited to the embodiments described above, but encompasses any and all embodiments within the scope of the following claims.

I claim:

1. A diagnostic and measurement system with branched optical fibers, comprising:
   a structural element having a branched optical fiber embedded therein, the branched optical fiber including a primary optical fiber segment and at least one secondary optical fiber segment branching therefrom, wherein the primary optical fiber segment and the at least one secondary optical fiber segment are spliced to one another such that respective cores thereof are in optical communication with one another at a point of branching;
   a laser diode optically coupled with the primary optical fiber segment;
   one or more fiber Bragg grating sensors on and in optical communication with the primary optical fiber segment and the at least one secondary optical fiber segment; and
   an optical spectral analyzer in communication with the plurality of fiber Bragg grating sensors, the optical spectral analyzer receiving signals generated by the fiber Bragg grating sensors representative of a magnitude of a physical parameter of the structural element.

2. The diagnostic and measurement system with branched optical fibers as recited in claim 1, wherein the physical parameter of the structural element includes at least one of strain, stress, deformation and temperature.

3. The diagnostic and measurement system with branched optical fibers as recited in claim 1, wherein the at least one secondary optical fiber segment has at least one tertiary optical fiber segment branching therefrom.

4. The diagnostic and measurement system with branched optical fibers as recited in claim 1, wherein the structural element includes a thermoplastic or metal material.

5. The diagnostic and measurement system with branched optical fibers as recited in claim 4, wherein the structural element includes a sintered metal material.

6. The diagnostic and measurement system with branched optical fibers as recited in claim 1, wherein the one or more fiber Bragg grating sensors includes a plurality of fiber Bragg grating sensors, the plurality of fiber Bragg grating sensors including a first set of the plurality of fiber Bragg grating sensors arranged on and in optical communication with the primary optical fiber segment, and a second set of the plurality of fiber Bragg grating sensors arranged on, and in optical communication with the at least one secondary optical fiber segment.

* * * * *